(12) United States Patent
Römer (10) Patent No.: US 11,945,354 B2
(45) Date of Patent: Apr. 2, 2024

(54) METHOD FOR ASSEMBLING A LINEAR ACTUATOR FOR A MOTOR VEHICLE SEAT

(71) Applicant: Faurecia Autositze GmbH, Stadthagen (DE)

(72) Inventor: Bernd Römer, Stadthagen (DE)

(73) Assignee: Siemens Aktiengesellschaft, Munich (DE)

(*) Notice: Subject to any disclaimer, the term of this patent is extended or adjusted under 35 U.S.C. 154(b) by 946 days.

(21) Appl. No.: 16/400,761

(22) Filed: May 1, 2019

(65) Prior Publication Data
US 2019/0337436 A1    Nov. 7, 2019

(30) Foreign Application Priority Data
May 2, 2018 (DE) ..................... 10 2018 110 526.6

(51) Int. Cl.
| | |
|---|---|
| *B60N 2/02* | (2006.01) |
| *B60N 2/23* | (2006.01) |
| *B60N 2/90* | (2018.01) |
| *F16B 2/22* | (2006.01) |
| *F16H 25/24* | (2006.01) |

(52) U.S. Cl.
CPC .............. *B60N 2/929* (2018.02); *F16B 2/22* (2013.01); *F16H 25/24* (2013.01)

(58) Field of Classification Search
CPC .......... B60N 2/929; B60N 2/23; B60N 2/231; B60N 2/232; B60N 2/233; B60N 2/36; B60N 2/235; B60N 2/2352; B60N 2/2354; B60N 2/2356; B60N 2/2358; B60N 2/2362; B60N 2/164; B60N 2/166; B60N 2/067; B60N 2/1853

USPC ............ 297/344.17, 362.14, 362.12, 362.11
See application file for complete search history.

(56) References Cited

U.S. PATENT DOCUMENTS

| | | | | |
|---|---|---|---|---|
| 4,721,337 | A * | 1/1988 | Tomita ................. | B60N 2/0232 297/344.1 |
| 5,172,601 | A * | 12/1992 | Siegrist ................. | B60N 2/233 403/348 |
| 5,575,531 | A | 11/1996 | Gauger et al. | |
| 5,638,722 | A * | 6/1997 | Klingler ................. | B60N 2/66 74/501.5 R |

(Continued)

FOREIGN PATENT DOCUMENTS

| | | |
|---|---|---|
| DE | 102006005499 | 11/2006 |
| DE | 102016007870 | 1/2018 |

OTHER PUBLICATIONS

German Search Report dated Dec. 10, 2018 with respect to counterpart German patent application 10 2018 110 526.6.

(Continued)

*Primary Examiner* — Kyle J. Walraed-Sullivan
(74) *Attorney, Agent, or Firm* — Henry M. Feiereisen LLC (57) ABSTRACT

The invention relates to a method for assembling a linear actuator for adjustment of a first seat component of a motor vehicle seat compared to a second seat component of the motor vehicle seat, having the method steps of introducing a first part of the linear actuator in a first alignment into a bearing point of the first seat component, wherein the bearing point is a part of the first seat component or connected to the first seat component, changing the first alignment of the linear actuator to a second alignment and fixing the linear actuator to the second seat component.

7 Claims, 5 Drawing Sheets

(56) References Cited

U.S. PATENT DOCUMENTS

| | | | |
|---|---|---|---|
| 7,252,278 B2* | 8/2007 | Garrido | B60N 2/0232 |
| | | | 248/424 |
| 2008/0254473 A1 | 10/2008 | Chen et al. | |
| 2010/0187789 A1* | 7/2010 | Dudding | B60G 7/001 |
| | | | 280/124.116 |
| 2018/0029508 A1* | 2/2018 | Carl | B60N 2/366 |
| 2019/0337413 A1* | 11/2019 | Römer | B60N 2/08 |
| 2019/0337436 A1* | 11/2019 | Römer | F16H 25/24 |
| 2021/0155133 A1* | 5/2021 | Kachnowski | B60N 2/78 |

OTHER PUBLICATIONS

Translation of German Search Report dated Dec. 10, 2018 with respect to counterpart German patent application 10 2018 110 526.6.

* cited by examiner

METHOD FOR ASSEMBLING A LINEAR ACTUATOR FOR A MOTOR VEHICLE SEAT

CROSS-REFERENCES TO RELATED APPLICATIONS

This application claims the priority of German Patent Application, Serial No. 10 2018 110 526.6, filed May 2, 2018, pursuant to 35 U.S.C. 119(a)-(d), the disclosure of which is incorporated herein by reference in its entirety as if fully set forth herein.

BACKGROUND OF THE INVENTION

The present invention relates to a linear actuator for adjustment of a seat component of a motor vehicle seat having a spindle with a spindle head, a fastening means, wherein the fastening means is connected to the spindle head and wherein the fastening means is connectable to a first seat component of the motor vehicle seat.

The following discussion of related art is provided to assist the reader in understanding the advantages of the invention, and is not to be construed as an admission that this related art is prior art to this invention.

Adjustable motor vehicle seats allow the user to adapt the motor vehicle seat individually. They serve therefore the comfort and the safety of the user by enabling the user, for example, to maintain a sufficiently large distance between the seat and installation parts in the front area of the motor vehicle and therefore to reduce the risk of injury in the case of a rear-end collision. For adjustment of the seat support in the height and the longitudinal direction of the motor vehicle, a linear actuator is installed in the motor vehicle seat.

It would be desirable and advantageous to provide an improved method for assembling a linear actuator into a motor vehicle seat which method obviates prior art shortcomings, requires few parts and is easy and fast to perform in a cost-effective manner.

SUMMARY OF THE INVENTION

According to one aspect of the present invention, a method for assembling a linear actuator for adjustment of a first seat component of a motor vehicle seat in relation to a second seat component of the motor vehicle seat, includes introducing a first part of the linear actuator in a first alignment into a first bearing point of the first seat component, with the first bearing point being part of the first seat component or connected to the first seat component, changing the first alignment of the linear actuator to a second alignment, and fixing the linear actuator to the second seat component.

A method according to the present invention for assembling a linear actuator includes three method steps: In the first method step, a first part of the linear actuator in a first alignment is introduced into a bearing point of the first seat component to be adjusted. The bearing point is part of the first seat component or connected to the first seat component. In the second method step, the first alignment of the linear actuator is changed to a second alignment. In the third method step, the linear actuator is fixed to the second seat component.

For the installation of the linear actuator in the motor vehicle seat, the linear actuator is introduced into the bearing point in a first alignment. The linear actuator is then twisted into a second alignment. The pivot point is formed by the fastening means mounted in the bearing point. The second seat part has a fastening device into which the end of the linear actuator which is opposite the fastening means is fastened. The installation of the linear actuator in the motor vehicle seat does not require any tools and is simple and fast to realize.

According to another advantageous feature of the present invention, the linear actuator can includes a fastening means. The fastening means can be connected to the head of the linear actuator spindle via a clip connection. The fastening means can be plugged onto the spindle head and firmly connected to the spindle head by the clip connection. The fastening means can have one or more detents which spring into corresponding recesses in the spindle head during assembling and thereby ensure a conclusive connection. Manufacture of the connection requires no tools and only a short amount of time.

According to another advantageous feature of the present invention, the change from the first alignment to a second alignment can be carried-out by a pivoting movement of the linear actuator. The axis of the pivoting movement is vertical to the longitudinal axis of the linear actuator. The fastening means can be introduced into a bearing point of a seat component of the motor vehicle seat and is pivot-mounted. A pivoting movement around a rotational axis passing through the fastening means and vertical to the longitudinal axis of the linear actuator leads the linear actuator to a second alignment in which the linear actuator can be fixed to a second seat component.

According to another advantageous feature of the present invention, a second part of the linear actuator can be introduced into a second bearing point. The second bearing point may be part of the second seat component or may be connected to the second seat component. The second seat component is adjustable compared to the first seat component by means of the linear actuator and therefore needs a bearing point for the linear actuator into which it can be introduced.

According to another advantageous feature of the present invention, the second part of the linear actuator can be fixed in the second bearing point. The fixation occurs in a way that minor angular changes of the linear actuator are compensated during the adjustment.

According to another advantageous feature of the present invention, the second bearing point can have a second fastening means. This second fastening means is formed in a way that it can accommodate the second part of the linear actuator. The material of the second fastening means is ideally a flexible but sufficiently firm material, e.g. a plastic.

According to another advantageous feature of the present invention, the second fastening means can be clipped into the second bearing point. The second fastening means can have one or more detents which spring into corresponding recesses in the second bearing point during assembly and ensure a firm connection. The production of the connection requires no tools and only a short amount of time.

According to another advantageous feature of the present invention, the second fastening means can be a sleeve that encloses the second part of the linear actuator. Advantageously, it is possible to install linear actuators with different designs in the motor vehicle seat due to the different shapes of the sleeve. The second bearing point for the sleeve can therefore have a constant shape and the different shapes of the sleeve enable the installation of correspondingly designed linear actuators.

According to another advantageous feature of the present invention, the second fastening means can be sealed by snapping a detent of the second fastening means into a first cut-out. During sealing, the detent springs into the first cut-out and securely and reliably seals the second fastening with the second part of the linear actuator.

According to another advantageous feature of the present invention, the first cutout can be arranged at the second bearing point.

According to another advantageous feature of the present invention, an inspection of the correct assembling can occur after fixing the linear actuator to the second seat component. By positioning the detent in the first cutout, the technician can immediately and reliably determine whether the second fastening means is correctly sealed. Further inspections, in particular through complex measurement methods, are not necessary.

According to another aspect of the present invention, a fastening means for assembling a linear actuator is constructed in the form of a sleeve.

In accordance with the present invention, linear actuators with different designs can be installed in the motor vehicle seat due to the different shapes of the sleeve. The second bearing point for the sleeve can therefore have a constant shape and the different shapes of the sleeve enable the installation of correspondingly designed linear actuators.

According to another advantageous feature of the present invention, the second fastening means can have two arms. One arm is connected to the second bearing point of the second seat component, and another arm encloses, supports and holds the second part of the linear actuator in position.

According to another advantageous feature of the present invention, the arms are movable to each other and connected with each other. The movable connection enables closure of the second fastening means after the second part of the linear actuator has been embedded into the second fastening means.

According to another advantageous feature of the present invention, the first arm of the second fastening means can have a journal which can be introduced into a bearing of a bearing point of a seat component. For installation of the second fastening means, the journal is inserted into the bearing. The second fastening means is therefore pivot-mounted in the bearing and correctly positioned.

According to another advantageous feature of the present invention, the first arm of the fastening means can have a detent that is designed to engage in a second cut-out in the bearing point of the seat component. The first arm is fastened and fixed in place in the second cut-out in the bearing point via this engaging.

According to another advantageous feature of the present invention, the second arm can be divided in two. Both parts of the second arm are connected by a crosspiece. This elaboration needs less material for the production of the second fastening means. The connection by means of a crosspiece enables still a safe and stable fastening of the linear actuator.

According to another advantageous feature of the present invention, the second arm of the fastening means can have a detent which can be engaged in a first cut-out. The detent engages in the first cut-out and seals in this way the second fastening means.

According to another advantageous feature of the present invention, the detent can be designed to be movable. During the detent procedure, the detent can be moved into a third cut-out of the second arm of the second fastening means. In the engaged position, the detent is positioned outside the third cut-out. For sealing the second fastening means, the detent engages in the first cut-out and pivots temporarily into the third cut-out. In this way, the detent is sealing the second fastening device.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
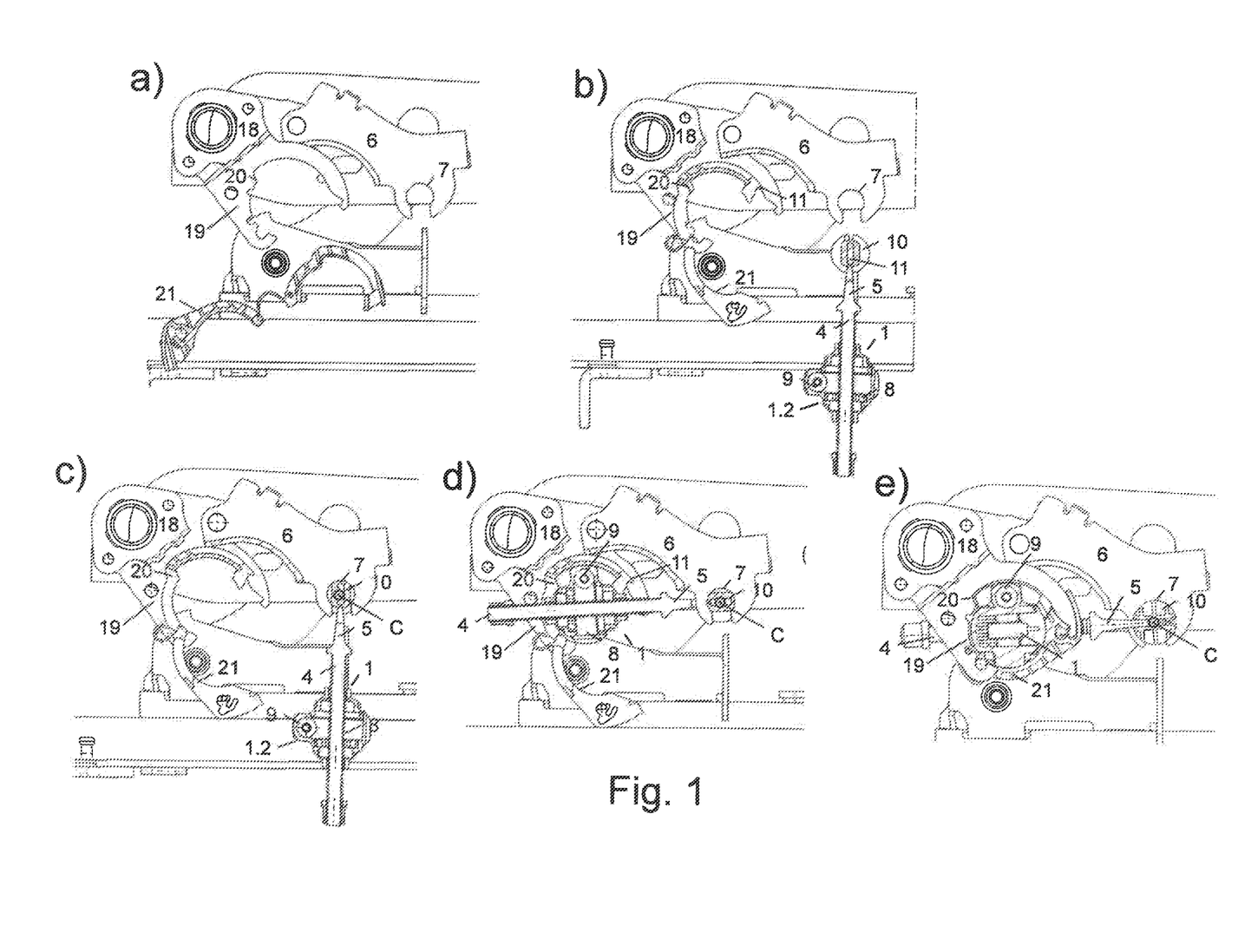
FIG. 1a shows a method of assembling a linear actuator.
FIG. 1b shows a method of assembling a linear actuator, vertical alignment of the linear actuator.
FIG. 1c shows a method for assembling a linear actuator, introduced in a first bearing point.
FIG. 1d shows a method of assembling a linear actuator, introduced in a first and a second bearing point.
FIG. 1e shows a method for assembling a linear actuator, the second bearing point arrested.

Turning now to the drawing, and in particular to FIGS. 1a to 1e, there are shown various steps of a method for assembling a linear actuator 1. The motor vehicle seat 3 has a first seat component $ which is adjusted in comparison with a second seat component 18. The second fastening means 21, which is advantageously formed as a sleeve, is installed in the bearing point of the second seat component 20 (FIG. 1a). The sleeve 21 has two arms which are movably connected to each other. One arm of the sleeve 21 is fastened in the bearing point of the second seat component 20. A particularly simple assembling of the sleeve 21 is achieved by means of a clip connection between the sleeve 21 and the bearing point of the second seat component 20.

The linear actuator 1 has a spindle 4, an engagement means 8 which engages with the spindle 4, and a motor 9. The motor 9 drives the spindle 4 via the engagement means 8, which performs a linear movement along the spindle 4. The spindle head 5 has a fastening means 10.

For the installation of the linear actuator 1 in the motor vehicle seat, the linear actuator 1 is positioned in a first alignment A, usually an essentially vertical alignment of the linear actuator 1, under the bearing point 7 (FIG. 1b). Afterwards the linear actuator 1 is introduced into the bearing point 7 so that the bearing point 7 accommodates the fastening means 10 (FIG. 1c), In the next step, the linear actuator 1 is twisted to an essentially horizontal alignment B. The pivot point is formed by the fastening means 10 mounted in the bearing point 7, the rotational axis is vertical to the longitudinal axis of the linear actuator 1 (FIG. 1d), In the last method step, the linear actuator 1 is fixed in the second fastening means 21 by leading the second arm of the sleeve 21 around the second part 1.2 of the linear actuator 1 and connecting it to the first arm of the sleeve 21 by means of a clip connection (FIG. 1e). The installation of the linear actuator 1 in the motor vehicle seat does not require any tools and can be realized simply and quickly. When the linear actuator 1 is actuated, the first seat component 6 is adjusted in a linear manner compared to the second seat component 18, e.g. the seat depth of a motor vehicle seat can be adjusted via the linear actuator 1. The linear actuator 1 is pivot-mounted in the fastening device of the second seat component 19 and in the bearing point 7 of the first seat component 6 so that minor angular changes of the linear actuator 1 are compensated during adjustment. Vibrations during the adjustment of the linear actuator 1 are also damped by the vibration damping material of the fastening means 10 and the sleeve 21.

Figure 2:
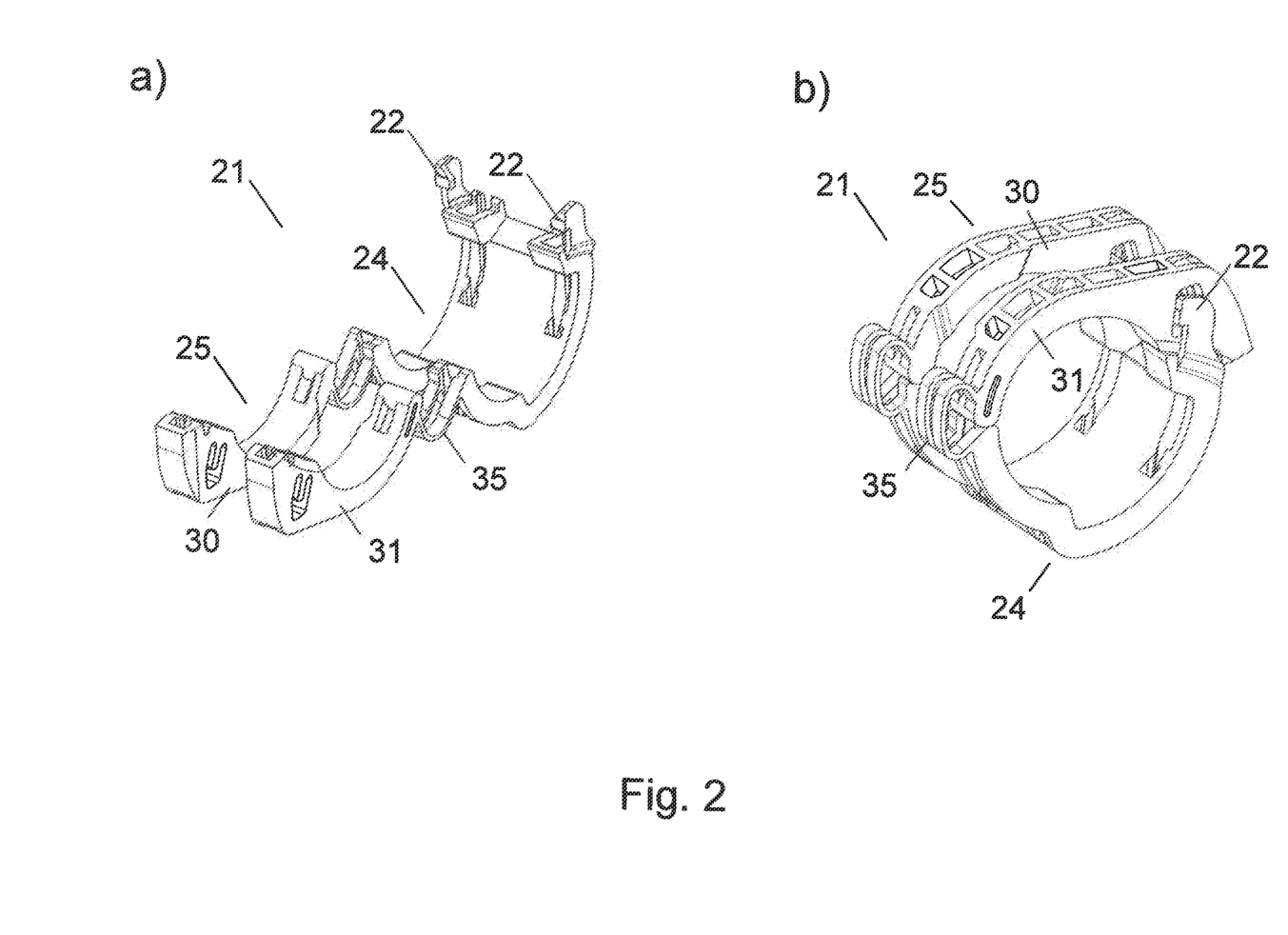
FIG. 2a shows a spatial representation of the second fastening means, unsealed.
FIG. 2b shows a spatial representation of the second fastening means, sealed.

FIGS. 2a and 2b show detailed views of the second fastening means 21. The fastening means 21 has two arms 24, 25, each with an approximately semicircular curved profile (FIG. 2a). The first arm is formed as a bearing shell which accommodates the second part 1.2 of the linear actuator 1. The second arm has two parts, each with notched depressions on the top, which are parts of the clip connection to the bearing point of the second seat component. Both parts of the second arm can be connected by a crosspiece. Both arms 24, 25 are pivotally connected to each other via a flexible connection 35. In the sealed state, both arms 24, 25 are sealed to each other by means of a clip connection (FIG. 2b). The first arm has detents 22 for this purpose, which engage in the corresponding depressions of both parts of the second arm. The second fastening means 21 is preferably made of a flexible but sufficiently rigid material, e.g. plastic.

Figure 3:
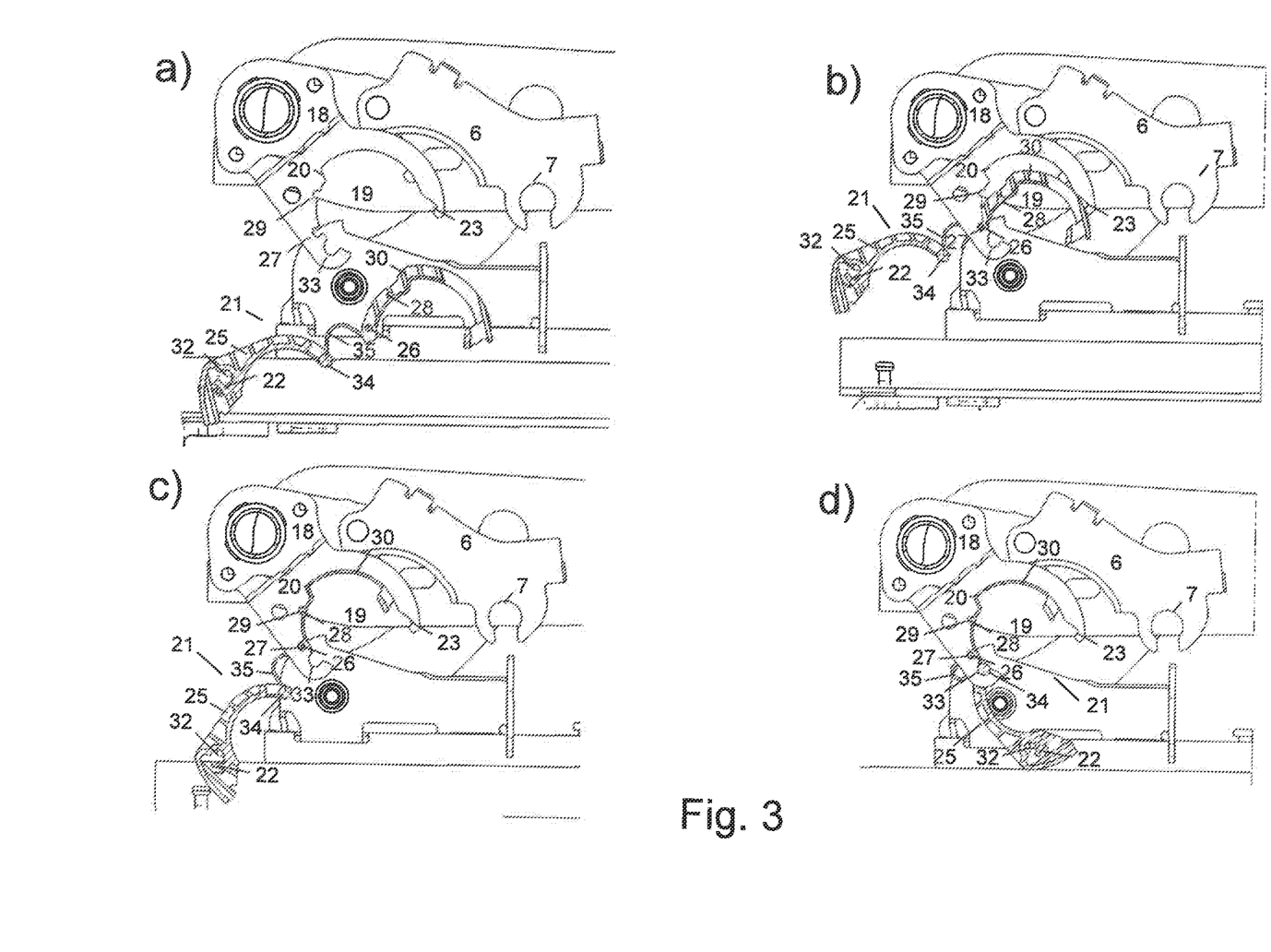
FIG. 3a shows an installation of the second fastening means.
FIG. 3b shows an installation of the second fastening means, journal inserted in bearing.
FIG. 3c shows an installation of the second fastening means, second arm arrested in bearing point.
FIG. 3d shows an installation of the second fastening means, second journal inserted into second bearing.

FIGS. 3a to 3d show various steps of installation of the second fastening means 21 in the motor vehicle seat. The motor vehicle seat 3 has a first seat component 6 which is adjusted in comparison with a second seat component 18. The first seat component 6 has a bearing point 7 for the fastening means 10, the bearing point of the second seat component 20 has a fastening device 19 (PG. 3a). For the installation of the second fastening means 21, the journal 26 is first inserted into the bearing 27 (FIG. 3b). The second fastening means 21 is pivot-mounted in the bearing 27. Afterwards the second fastening means 21 is pivoted around the journal 26 so that the detent on the second fastening means 28 engages in the second cut-out in the fastening device on the second seat component 29 by means of a clip connection (FIG. 3c). The first part of the second arm of the second fastening means 30 is arrested in the bearing point 20. At last the journal on the second arm of the fastening means 34 is inserted into the bearing point for the second arm of the second fastening means 33 (FIG. 3d). The second fastening means 21 is arrested in the fastening device 19, the second arm of the fastening means 25 is pivot-mounted by the flexible connection of both arms of the second fastening means 35 and can accommodate the second part 1.2 of the linear actuator 1. The installation of the second fastening means 21 does not require any tools and can be performed fast and simple.

Figure 4:
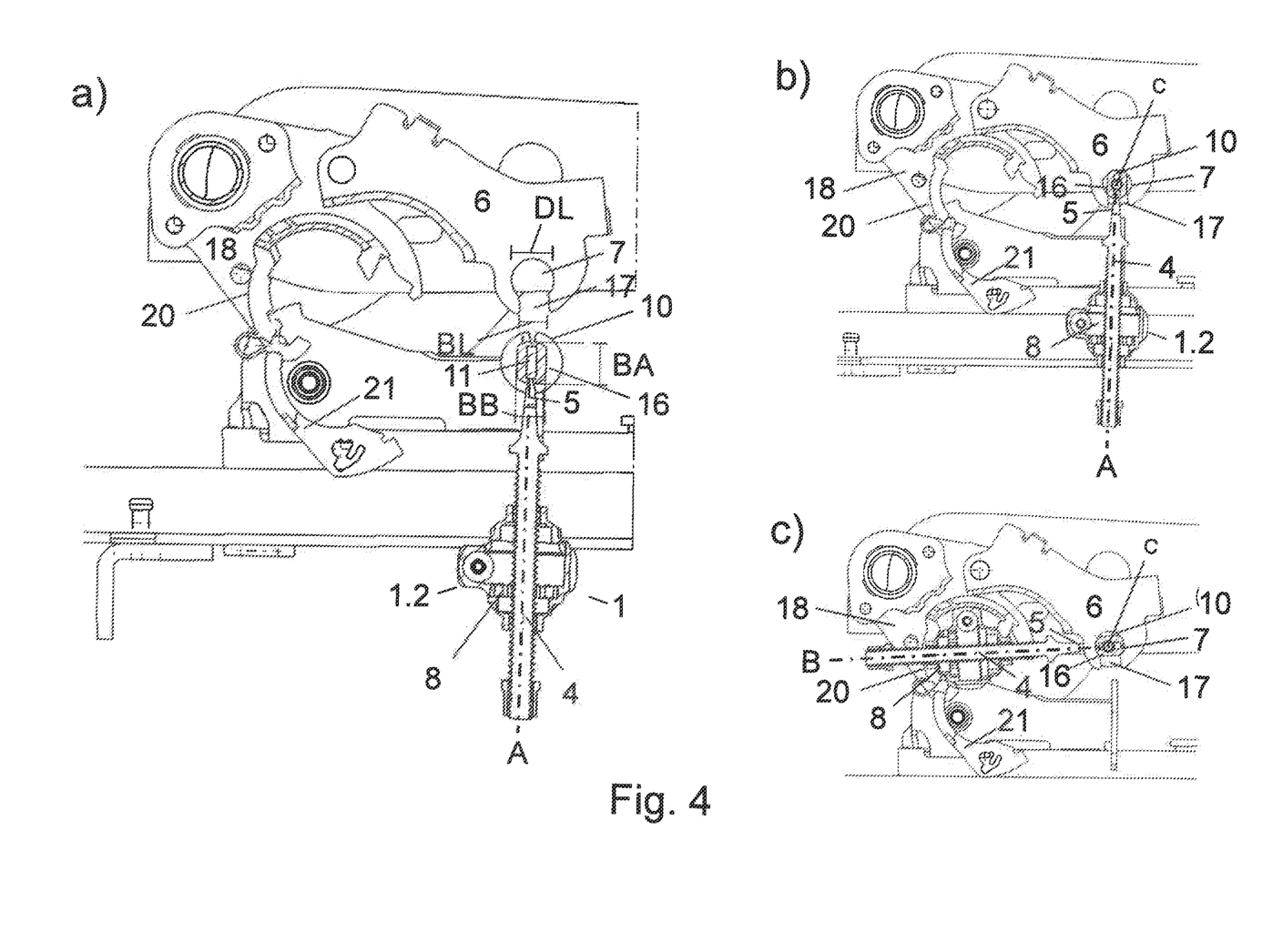
FIG. 4a shows an installation of the linear actuator, first alignment.
FIG. 4b shows an installation of the linear actuator, first alignment, fastening means in the opening of the first seat part.
FIG. 4c shows an installation of the linear actuator, second alignment, fixation into the second seat part.

FIGS. 4a to 4c show various steps of installation of the linear actuator 1 in the motor vehicle seat 3 with installed second fastening means 21. The motor vehicle seat 3 has a first seat component 6 which is adjusted in comparison with a second seat component 18. The linear actuator 1 has a spindle 4, an engagement means 8 which engages the spindle 4, and a fastening means 10 which is fastened to the spindle head 5 by means of a clip connection 11. The first seat part 6 has an annular bearing point 7 which has an opening 17 on the underside (FIG. 4a). For the installation of the linear actuator 1 in the motor vehicle seat 3, the linear actuator 1 is introduced in a first alignment A in an essentially vertical direction of the linear actuator 1 through the opening 17 into the bearing point 7 (FIG. 4b). The bearing point 7 of the first seat part 6 has an opening 17 on its underside, whose width BL is greater than the width of the fastening means 10 in the cross-section BA running through the middle of the slot 16 in the direction of the fastening means 10, The linear actuator 1 is then rotated into an essentially horizontal alignment B (FIG. 4c). The pivot point is formed by the fastening means 10 mounted in the bearing point 7. In this alignment B of the linear actuator 1, the width of the fastening means 10 in the cross-section BB running through the middle of the slot 16 is greater than the width of the opening 17 and at the same time smaller than the inner diameter of the bearing point DL. Due to the dimensions of fastening means 10, bearing point 7 and opening 17, the fastening means 10 is pivot-mounted in the bearing point 7 and cannot detach from the bearing point 7.

Figure 5:
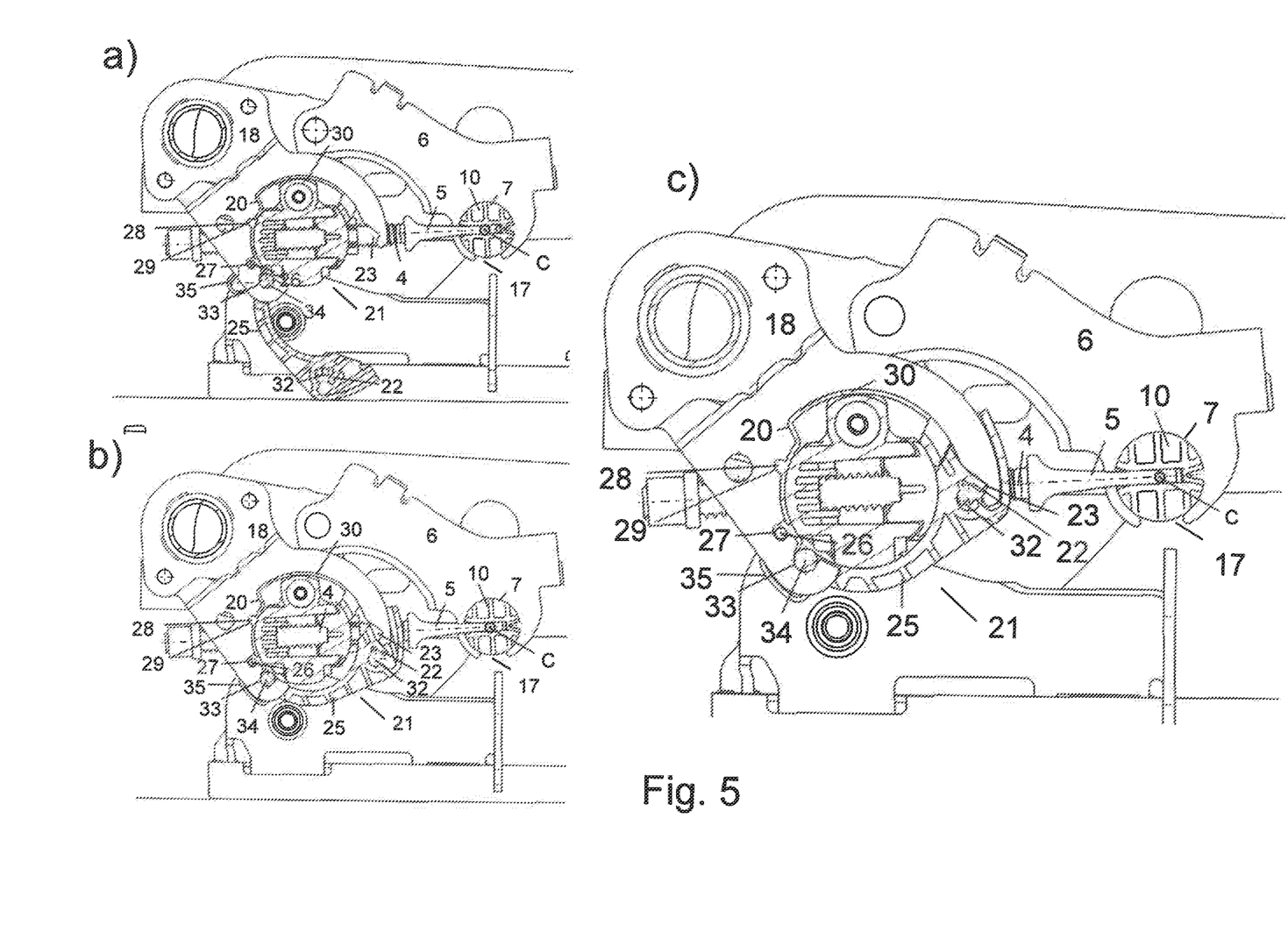
FIG. 5a shows an installation of the linear actuator, first alignment, dimensions of the linear actuator and the fastening devices.
FIG. 5b shows an installation of the linear actuator, first alignment, fastening means in the opening of the first seat part and dimensions of the linear actuator and the fastening devices.
FIG. 5c shows an installation of the linear actuator, second alignment, fixation into the second seat part and dimensions of the linear actuator and the fastening devices.

FIGS. 5a to 5c show an accommodation of the second part 1.2 of the linear actuator 1 by the second fastening means 21. The motor vehicle seat 3 has a first seat component 6 which is adjusted in comparison with a second seat component 18. The linear actuator 1 has a spindle 4, an engagement means 8 which engages the spindle 4, and a fastening means 10 which is fastened to the spindle head 5 by means of a clip connection 11. The first seat part 6 has an annular bearing point 7 with an opening 17 on the underside. The first seat component 6 has a bearing point 7 for the fastening device 10, the bearing point of the second seat component 20 has a fastening device 19. The journal 26 of the second fastening means 21 is pivot-mounted in the bearing 27. The detent 28 on the second fastening means 21 is engaged in the second cut-out 29 in the fastening device 19 on the second seat component 18 by means of a clip connection. The first part of the second arm of the second fastening means 30 is arrested in the bearing point 20. The journal on the second arm of the fastening means 34 is inserted into the bearing point for the second arm of the second fastening means 33, and the second arm of the fastening means 25 is pivot-mounted by the flexible connection of both arms of the second fastening means 35 (FIG. 5a) and accommodates the second part 1.2 of the linear actuator. For this purpose the second arm of the fastening means 31 is pivoted around the flexible connection 35 (FIG. 5b). The detent 22 touches the bearing point on the second seat component 20. By pressing further on the second arm of the fastening means 31, the detent 22 engages in the first cut-out 23 and pivots temporarily into the third cut out 32. In this way the detent is sealing the second fastening means (FIG. 5c). This favorable formation also enables a visual inspection. The technician can determine immediately and reliably whether the second fastening means 21 is correctly sealed by positioning the detent 22 in the first cut-out 23. The linear actuator 1 is pivot-mounted in the fastening device of the second seat part 19 and in the bearing point 7 of the first seat part 6 so that minor angular changes of the linear actuator 1 are compensated during adjustment. Vibrations that occur during the adjustment of the linear actuator 1 are also damped by the vibration damping material of the fastening means 10, 21. The installation of the linear actuator 1 does not require any tools to be used by the technician. The correct installation must also be inspected quickly and reliably.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for assembling a linear actuator for adjustment of a first seat component of a motor vehicle seat in relation to a second seat component of the motor vehicle seat, said method comprising:
   connecting a spindle head of the linear actuator with a fastening means via a clip connection, wherein the fastening means has one or more detents which spring into corresponding recesses in the spindle head;
   introducing the first part of the linear actuator in a first alignment into a first bearing point of the first seat component so that the first bearing point accommodates the fastening means and forms a pivot point so that the fastening means is pivot-mounted in the first bearing point, with the first bearing point being part of the first seat component or connected to the first seat component;
   changing the first alignment of the linear actuator to a second alignment by a pivoting movement of the linear actuator at the pivot point;
   providing a second bearing point which is part of the second seat component or is connected to the second seat component with a second fastening means, wherein the second fastening means is a sleeve and the sleeve is clipped into the second bearing point;
   introducing a second part of the linear actuator into the sleeve and second bearing point; and
   fixing the linear actuator to the second seat component.

2. The method of claim 1, wherein the linear actuator is changed from the first alignment to the second alignment by the pivoting movement around an axis extending vertical to a longitudinal axis of the linear actuator.

3. The method of claim 1, further comprising fixing the second part of the linear actuator in the second bearing point.

4. The method of claim 1, wherein the sleeve is configured to enclose the second part of the linear actuator.

5. The method of claim 1, further comprising inspecting, after the linear actuator has been fixed to the second seat component, for a presence of a correct assembly.

6. A method for assembling a linear actuator for adjustment of a first seat component of a motor vehicle seat in relation to a second seat component of the motor vehicle seat, said method comprising:
   connecting a first part of the linear actuator with a fastening means via a clip connection;
   introducing the first part of the linear actuator in a first alignment into a first bearing point of the first seat component so that the first bearing point accommodates the fastening means, with the first bearing point being part of the first seat component or connected to the first seat component;
   changing the first alignment of the linear actuator to a second alignment;
   providing a second bearing point which is part of the second seat component or is connected to the second seat component with a second fastening means, wherein the second fastening means is a sleeve and the sleeve is clipped into the second bearing point;
   introducing a second part of the linear actuator into the sleeve and second bearing point; and
   fixing the linear actuator to the second seat component, further comprising sealing the second fastening means by snapping a detent of the second fastening means into a first cut-out.

7. The method of claim 6, wherein the first cut-out is arranged at the second bearing point.

\* \* \* \* \*

UNITED STATES PATENT AND TRADEMARK OFFICE
CERTIFICATE OF CORRECTION

PATENT NO. : 11,945,354 B2
APPLICATION NO. : 16/400761
DATED : April 2, 2024
INVENTOR(S) : Bernd Römer It is certified that error appears in the above-identified patent and that said Letters Patent is hereby corrected as shown below:

On the Title Page

Item (73) Assignee:
Replace "Siemens Aktiengesellschaft, Munich (DE)" with --Faurecia Autositze GmbH, Stadthagen (DE)--

Signed and Sealed this
First Day of October, 2024

Katherine Kelly Vidal
*Director of the United States Patent and Trademark Office*